(12) United States Patent
Wilth et al.

(10) Patent No.: US 11,951,471 B2
(45) Date of Patent: Apr. 9, 2024

(54) PIPETTE FOR USE WITH A PIPETTE TIP OR SYRINGE HAVING A PISTON AND A CYLINDER

(71) Applicant: Eppendorf AG, Hamburg (DE)

(72) Inventors: Marc Wilth, Hamburg (DE); Dana Tuchscherer, Buchholz i.d. Nordhelde (DE); Matthias Kunsch, Hamburg (DE); Florian Tesch, Hamburg (DE); Burghardt Reichmuth, Hamburg (DE)

(73) Assignee: Eppendorf AG, Hamburg (DE)

( * ) Notice: Subject to any disclaimer, the term of this patent is extended or adjusted under 35 U.S.C. 154(b) by 201 days.

(21) Appl. No.: 17/354,193

(22) Filed: Jun. 22, 2021

(65) Prior Publication Data

US 2021/0394170 A1 Dec. 23, 2021

(30) Foreign Application Priority Data

Jun. 22, 2020 (EP) ..................................... 20181406

(51) Int. Cl.
*B01L 3/02* (2006.01)
*G01N 35/10* (2006.01)

(52) U.S. Cl.
CPC ........... *B01L 3/0227* (2013.01); *B01L 3/0282* (2013.01); *G01N 35/1011* (2013.01);
(Continued)

(58) Field of Classification Search
CPC .............................. B01L 3/0227; H01H 19/63
See application file for complete search history.

(56) References Cited

U.S. PATENT DOCUMENTS 4,470,317 A * 9/1984 Sabloewski ........... B01L 3/0234
73/864.18
6,455,006 B1 9/2002 Mukai
(Continued)

FOREIGN PATENT DOCUMENTS

AU  1507676    4/1976
CN  1598990 A  3/2005
(Continued)

OTHER PUBLICATIONS

CN Application No. 202110685433.5, filed Jun. 21, 2021, Notification of Second Office Action, dated Mar. 29, 2023 (7 pages).
(Continued)

*Primary Examiner* — Maris R Kessel
*Assistant Examiner* — Mickey Huang
(74) *Attorney, Agent, or Firm* — Barclay Damon LLP

(57) ABSTRACT

A pipette for use with a pipette tip or syringe including a piston positioned within a cylinder comprises a pipette housing extending between an upper end and a lower end. Two parallel rods are positioned in the pipette housing, wherein one of the two parallel rods is coupled to a lifting rod. An operating element is configured to protrude outwardly from the pipette housing and be displaced relative to the pipette housing. A gear mechanism is arranged in the pipette housing and comprises a drive comprising a moveable input member and configured to be driven by the operating element, and an output comprising at least one moveable output member and configured to drive the two parallel rods. Successive displacements of the input member by the operating element are configured to alternately displace one of the two parallel rods and then another of the two parallel rods by the output member.

17 Claims, 9 Drawing Sheets

(52) U.S. Cl.
CPC . *B01L 2200/0605* (2013.01); *B01L 2200/087* (2013.01); *B01L 2400/0478* (2013.01)

(56) References Cited

U.S. PATENT DOCUMENTS

| | | |
|---|---|---|
| 2011/0020048 A1 | 1/2011 | Fukumoto |
| 2018/0250667 A1 | 9/2018 | Dudek et al. |
| 2019/0193072 A1* | 6/2019 | Schwartz .............. B01L 3/0275 |

FOREIGN PATENT DOCUMENTS

| | | | |
|---|---|---|---|
| CN | 105492811 A | 4/2016 | |
| CN | 110450562 A | 11/2019 | |
| DE | 102004003434 A1 | 8/2005 | |
| EP | 0085854 B1 | 3/1989 | |
| EP | 0566041 B1 | 11/1995 | |
| EP | 0656229 B1 | 7/1997 | |
| EP | 3527849 A1 * | 8/2019 | ............ F16H 19/04 |
| GB | 1389269 | 4/1975 | |
| GB | 2045641 B | 11/1980 | |
| JP | 2002113373 A | 4/2002 | |

OTHER PUBLICATIONS

CN Application No. 2021106854335, filed Jun. 21, 2021, English translation of Notification of Second Office Action, dated Mar. 29, 2023 (2 pages).

* cited by examiner

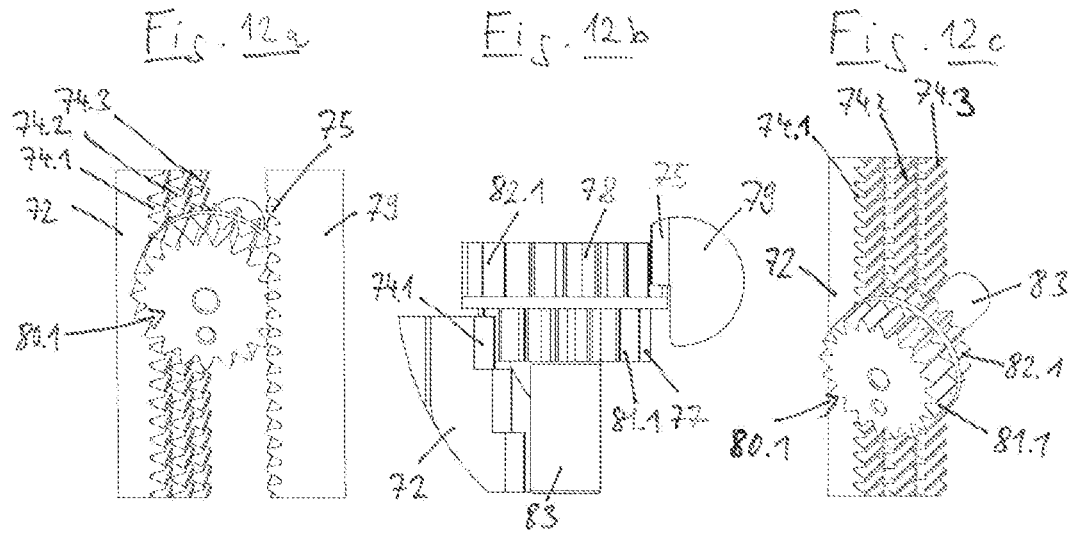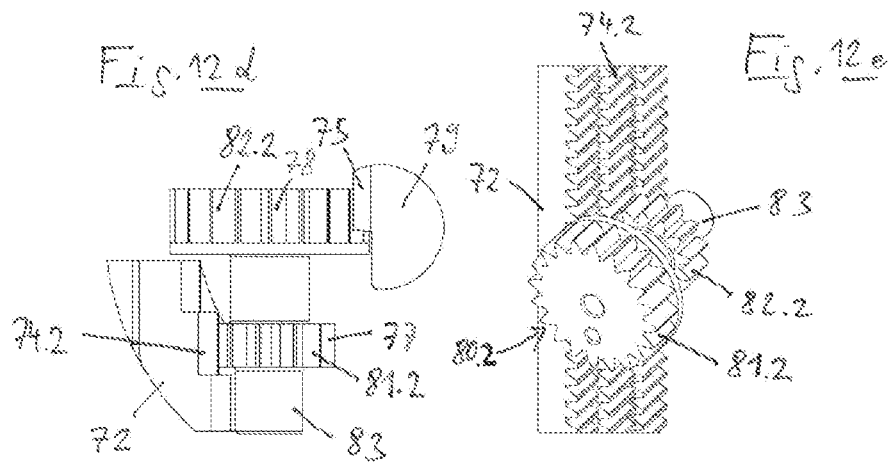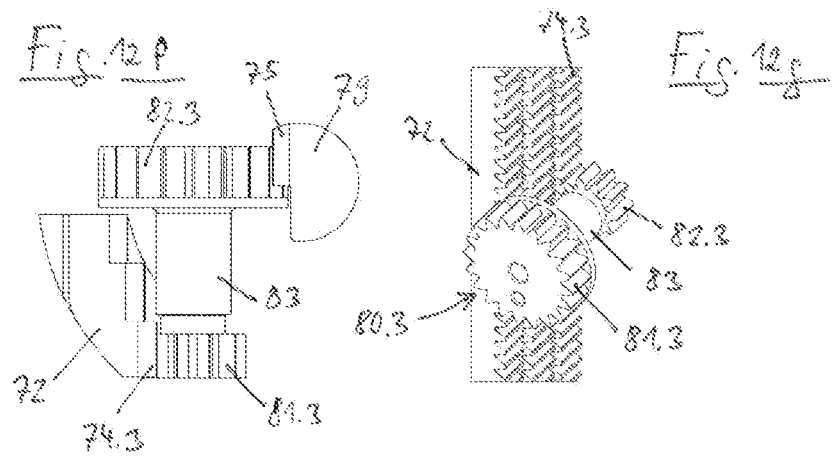

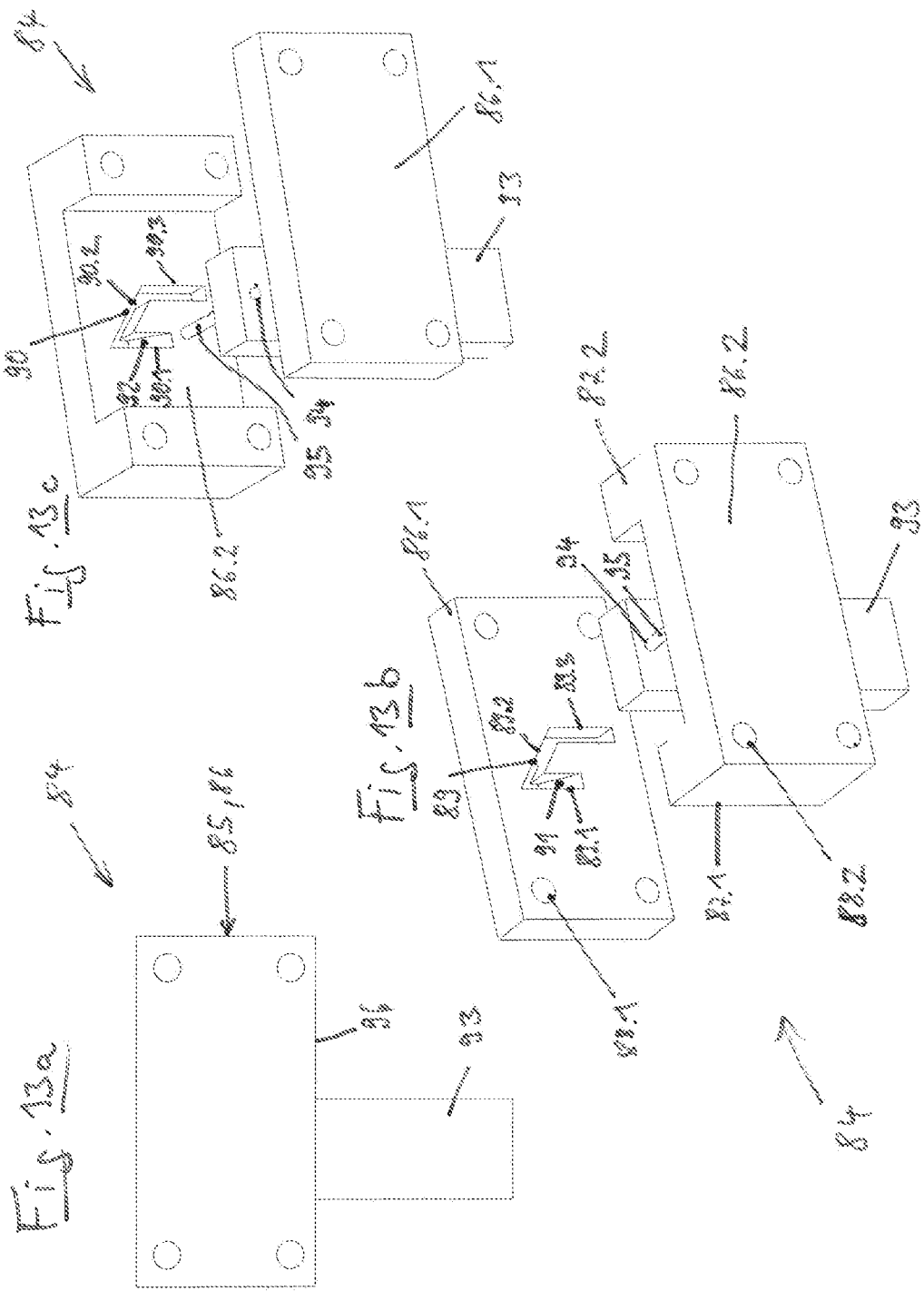

PIPETTE FOR USE WITH A PIPETTE TIP OR SYRINGE HAVING A PISTON AND A CYLINDER

CROSS REFERENCE TO RELATED INVENTION

This application is based upon and claims priority to, under relevant sections of 35 U.S.C. § 119, European Patent Application No. 20181406.8, filed Jun. 22, 2020, the entire contents of which are hereby incorporated by reference.

FIELD OF TECHNOLOGY

This disclosure relates to a pipette for use with a pipette tip or syringe having a piston and a cylinder.

BACKGROUND

Pipettes are used, in particular, in scientific and industrial laboratories with medical, molecular biological and pharmaceutical applications for metering selected volumes of liquids. The liquids may be, in particular, homogenous (single-phase) liquids consisting of a single liquid component or a homogenous mixture of a plurality of liquid components (solutions). The liquids may also be heterogeneous (multi-phase) mixtures of a liquid with a further liquid (emulsions) or a solid (suspension).

Known pipettes for use with a pipette tip have a stem-shaped pipette housing with a neck (attachment) at the lower end for clamp-fitting a pipette tip. The neck is generally a conical, cylindrical or a partially conical and cylindrical projection and is also denoted as the "working cone". A pipette tip is a small hollow tube with a tip opening at the lower end and an attachment opening at the upper end, the pipette tip being able to be clamp-fitted thereby onto the neck. The liquid is received into the pipette tip and dispensed therefrom. The receiving and dispensing of the liquid is controlled by means of the pipette. Fixed-volume pipettes serve for pipetting uniform volumes. In the case of variable pipettes, the volume to be metered is adjustable. A mechanical counter serves for displaying the adjusted volume. For adjusting the volume, the travel of a drive apparatus is adjustable by means of an adjusting apparatus which is coupled to the counter. The pipette tip is detached from the attachment after use and may be replaced by a fresh pipette tip. As a result, in the case of subsequent pipetting cross contamination may be avoided.

Air-cushion pipettes have in the pipette housing a piston-cylinder system which is connected via a channel to a through-hole in the neck. Pipette tips for air-cushion pipettes (air-cushion pipette tips) do not have an integrated piston. By displacing the piston in the cylinder by means of the drive apparatus, an air-cushion is moved in order to aspirate liquid into a pipette tip which is clamp-fitted onto the neck and to eject said liquid therefrom. Metering errors are a drawback in air-cushion pipettes, due to changes in the length of the air-cushion as a result of the weight of the aspirated liquid and due to changes in the temperature, the air pressure and the air humidity. A contamination of the pipette by aerosols may also be problematic.

Positive displacement pipettes are used with pipette tips having an integrated piston (positive displacement pipette tips). This type of pipette has a neck for fastening the pipette tip and a drive apparatus which may be coupled to the integrated piston (tip piston) for moving the piston. The piston comes into direct contact with the liquid so that the negative effects of an air cushion are eliminated. Positive displacement pipettes are suitable, in particular, for metering liquids with high vapor pressure, high viscosity or high density and applications in molecular biology in which the absence of aerosols is important in order to avoid contamination. Pipette tips or syringes for single use or for reuse with a pipette are comprised of plastics or glass.

In the case of the positive displacement pipette, Biomaster® 4830 from Eppendorf AG, the drive apparatus has a lifting rod for displacing a piston in a pipette tip, said lifting rod having a hollow lower lifting rod part and an upper lifting rod part inserted from above into the lower lifting rod part. The upper lifting rod part is connected to an operating element which protrudes from an upper end of the pipette housing. A pipette tip, Mastertip® from Eppendorf AG, with a nominal volume of 20 µl is able to be clamp-fitted onto a neck of the pipette. By pushing the operating element, the lifting rod may be displaced downwardly so that an upper end of the piston rod of a tip piston of the pipette tip is pushed into the lower lifting rod part. When the lifting rod is displaced downwardly as far as a lower stop, a spring apparatus is pretensioned. After the operating element is released, the spring apparatus displaces the lifting rod as far as an upper stop, wherein the tip piston is entrained and liquid may be aspirated into the pipette tip. The aspirated liquid may be dispensed by pushing the operating element again as far as the lower stop. For releasing the pipette tip, the user has to push onto the operating element with increased force so that a further spring apparatus is deflected, the upper lifting rod part is displaced downwardly in the lower lifting rod part, which pushes the piston out of the lower lifting rod part and pushes the pipette tip off the neck. The pipetting of highly viscous liquids with a positive displacement pipette having a spring apparatus for the upward displacement of the lifting rod is problematic, since the spring apparatus may be too weak for the aspiration of highly viscous liquids into the pipette tip. A spring apparatus with a stronger spring would require high actuating forces.

EP 0 656 229 B1 discloses a pipette system which comprises a manually handleable pipette and a syringe. The pipette has a receiver for a fastening portion on a syringe cylinder in a pipette housing and a piston receiver for a syringe piston in a receiver body. By means of gripping apparatuses which may be radially advanced, the fastening portion is able to be fixed in the receiver and the piston is able to be fixed in the piston receiver. The receiver body is connected to a return motion lever which protrudes out of an axial slot of the housing. By displacing the return motion lever upwardly, liquid is able to be received into a syringe connected to the pipette. The pipette is configured as a dispenser and, for the stepwise dispensing of partial quantities of the received liquid (dispensing) from the syringe, has a repeating mechanism which has a toothed rod connected to the piston receiver, a cover of the toothing of the toothed rod which is adjustable by means of a rotary knob and a detent mounted pivotably on a drive lever. The detent is pretensioned by a spring in the direction of the toothed rod. When pivoting the drive lever downwardly the detent slides over the cover, engages in the toothing after exceeding the lower end of the cover, and displaces the toothed rod downwardly. Liquid is hereby dispensed from the syringe, wherein the dispensed volume depends on the position of the cover. By a repeated actuation of the dispensing lever the syringe is able to be emptied in a stepwise manner. The pipette system is suitable for dispensing highly viscous liquids. However, for receiving and dispensing the liquid, the user has to change grip, since various levers have to be actuated therefor.

EP 0 566 041 B1 discloses a step pipette or, respectively, dispenser for use with a syringe which has a repeating mechanism with a toothed rod, a cover and a detent on a dispensing lever. The toothed rod is coupled to a toothed rod parallel thereto via a gearwheel arranged therebetween. The syringe may be filled by pushing down an actuating knob at the upper end of the last-mentioned toothed rod. Due to the coupling by the gearwheel, the first-mentioned toothed rod is displaced upwardly at the same time. The filled syringe is able to be emptied in a stepwise manner by repeated actuation of the dispensing lever. The dispensing lever and the actuating knob are arranged on different sides at the upper end of the pipette housing. It is necessary to change grip for receiving and dispensing liquids.

EP 0 085 854 B1 discloses a pipette for use with a syringe having two toothed rods which are movable alternately relative to one another and coupled by a gearwheel, one thereof being connected to a lifting rod for the piston. Only one actuating lever is present for the upward and downward movements of the piston. A stop element is present between the actuating lever and the toothed rods, said stop element being able to be displaced alternately into the path of the one toothed rod and the other toothed rod. To this end, the stop element comes into engagement with a movable cam which is pulled by a tension spring toward a stop. One of the two toothed rods is connected to a projecting stop which comes into contact with a lever protruding from the cam and pivots the cam away from the stop when this toothed rod is displaced upwardly. Depending on the position of the cam, the slider is displaced such that, when the actuating lever is actuated, the toothed rod which is respectively arranged at the top is entrained downwardly. Due to the coupling via the gearwheel the other toothed rod is hereby displaced upwardly. As a result, by successive actuation of the same actuating lever, liquid may be received into the syringe and dispensed therefrom. In this pipette the gear mechanism for the alternate displacement of the toothed rods is configured integrally with the drive mechanism. The projecting stop, via which the toothed rod acts on the gear mechanism control, is a constituent part of the gear mechanism. It is a drawback that the mechanism has a plurality of components which take up a large amount of space and the assembly of said components is complex.

BRIEF SUMMARY OF THE INVENTION

The object of the invention is to provide a pipette for use with a pipette tip or syringe having a piston and a cylinder and which, with simple operation, comprises a mechanism which is less complex, more space-saving and simpler to assemble.

An embodiment of a pipette for use with a pipette tip or syringe and having a piston and a cylinder comprises a stem-shaped pipette housing. A first retaining apparatus is positioned at the lower end of the pipette housing and is configured for the releasable retention of the cylinder. A lifting rod is arranged in the pipette housing with a second retaining apparatus at the lower end for the releasable retention of the upper end of a piston rod of the piston and the displacement of a sealing region of the piston in a piston running region above a tip opening at the lower end of the cylinder. An arrangement comprising two parallel rods in the pipette housing which are coupled together via a deflection apparatus so as to be simultaneously displaced in opposing directions. One of the two parallel rods is configured to couple to the lifting rod. An operating element protrudes outwardly from the pipette housing and is configured to be displaced relative to the pipette housing. A gear mechanism is arranged in the pipette housing and comprises a drive configured to be driven by the operating element and an output driving the rods. The drive comprises a movable input member and the output comprises at least one movable output member. The gear mechanism is configured, with successive displacements of the input member from the same initial position by the operating element, to displace alternately the one rod and the other rod downwardly by the output member.

In an embodiment of the pipette, the alternate displacement of the two rods downwardly may be controlled by actuating a single operating element. By means of the actuation, the operating element is displaced and a drive of a gear mechanism is driven. The drive consists of a movable input member which is displaced by actuating the operating element. An output of the gear mechanism comprises at least one movable output member. The gear mechanism is configured such that with successive displacements of the input member from the same initial position, which are effected by the operating element, the output member alternately displaces the one rod and the other rod downwardly. One of the two rods is coupled to the lifting rod. According to one embodiment, the rod is coupled via a gear mechanism to the lifting rod or fixedly connected thereto, for example by the rod being configured integrally with the lifting rod. As a result, by repeated actuation of the operating element it may be achieved that liquid is received into the pipette tip or syringe and then dispensed therefrom. The receiving of the liquid into the pipette tip or syringe may take place in a single step and the dispensing of the liquid from the pipette tip may take place in a single step or in a plurality of steps. As the drive of the gear mechanism is comprised of a movable input member, the gear mechanism is driven and controlled solely by actuating the operating element. In contrast to EP 0 085 854 B1 the position of a toothed rod is not returned into the gear mechanism via a further input member and used for controlling the gear mechanism. As a result, a gear mechanism having fewer components, a reduced space requirement and simpler assembly is permitted. The invention promotes the embodiment of the gear mechanism as a sub-assembly which may be completely preassembled, and then assembled with further sub-assemblies and/or components to form the finished pipette.

According to an embodiment, the two rods are toothed rods and the deflection apparatus is a gearwheel which cooperates or meshes with the two toothed rods in order to displace these toothed rods simultaneously in opposing directions. According to a further embodiment, the deflection apparatus is a two-armed lever (rocker) with a rotary joint arranged fixedly in position in the pipette housing and with a connection to the rods via sliding joints or a pull cable connected at the ends to the rods and guided via a deflection roller.

According to a further embodiment, the output member of the gear mechanism is a driver element and the gear mechanism is configured to displace the driver element into a position above the one rod and to displace this rod downwardly by means of the driver element, and subsequently to displace the driver element into a position above the other rod and to displace this other rod downwardly by means of the driver element. In the case of successive displacements of the input member from the same initial position by the actuating element, the driver element is displaced into positions above different rods. This takes place when the driver element is displaced upwardly and/or downwardly. If this takes place with the upward displacement into the initial position, the rod via which the driver element has been previously adjusted with the previous downward displacement of the input member from the initial position is entrained downwardly. If this takes place with the downward displacement from the initial position, the driver element is initially moved into a position above a further rod and with a further displacement of the driver element this further rod is entrained downwardly. In a further embodiment, if the driver element when displaced downwardly is initially displaced above the same rod slightly in the direction of the position above the other rod, the first-mentioned rod is entrained downwardly with a further displacement of the driver element, and the driver element is displaced into the position above the second-mentioned rod only with the upward displacement of the driver element.

According to a further embodiment, the movement of the operating element triggers a rotational movement of a driver element. To this end, the pipette has one or more internal mechanical components which are set in rotation by the specific shape of their tracks and lead-in chamfers. The rotating component has a geometry which ensures an alternate activation or, respectively, release of the toothed rods.

According to a further embodiment, the driver element is a wing disk which is rotatably mounted about an axis parallel to the rods and which with successive displacements of the input member from an initial position is able to be positioned alternately with a wing above the one rod and at the same time with an undercut above the other rod, and with an undercut above the one rod and at the same time with a wing above the other rod. For displacing a rod, the wing disk is positioned with a wing above the upper end of the rod so that the rod may be pushed downwardly by means of the wing. The other rod is received by the undercut so that it is not displaced downwardly therewith. According to a further embodiment, the driver element is rotatably mounted about an axis oriented between the rods. According to a preferred embodiment, the axis is oriented coaxially to the lifting rod. As a result, a uniform transmission of force onto the lifting rod is achieved in different positions of the output member.

According to a further embodiment, the wing disk has a plurality of wings and in each case an undercut between two adjacent wings. According to a further embodiment, the wing disk has a total of two wings and a total of two undercuts.

According to a further embodiment, the gear mechanism comprises a rod drive with the driver element, said rod drive having at least one first control cam, which may be activated by contact from above and which slopes in a peripheral direction, and at least one first guide element, an actuator which has a lateral stop and which may be pushed from above by means of the operating element in the axial direction of the rod against a first control cam, and at least one second guide element. The at least one second guide element is arranged fixedly in position in the pipette housing and which guides the rod drive on a first guide element in the axial direction, so that with an axial displacement of the actuator downwardly, the rod drive is guided in the axial direction until the upper end of the first guide element is displaced beyond the lower end of the second guide element, and the rod drive with the first control cam is rotated until the first guide element bears against the lateral stop of the actuator partially below the lower end of the second guide element, and with a return displacement of the actuator upwardly the first guide element is released from the lateral stop when the lower end of the first guide element is displaced beyond the upper end of the lateral stop, and the rod drive with the first control cam slides past the lower end of the second guide element until the rod drive with the first guide element is rotated into a position bearing against a second guide element. When the actuator is displaced downwardly, initially the rod drive is entrained downwardly and then rotated with the first control cam partially below the second guide element. With the further displacement of the actuator downwardly the rod drive is entrained further downwardly. In this case the driver element remains above the same rod above which it was already positioned at the start of the downward displacement of the actuator. With the return displacement of the actuator upwardly, the rod drive with the first guide element is released from the lateral stop of the actuator so that the rod drive with the first control cam is rotated further on the lower end of the second guide element until the driver element is arranged above a further rod. In this embodiment, the mechanism for rotating the driver element is similar to the gear mechanism of a ball point pen, by which the ballpoint pen reservoir may be moved by pushing the same pushing member into an extended writing position and into a retracted position. Such a mechanism is disclosed, for example, in U.S. Pat. No. 3,205,863. In a deviation from the gear mechanism of a ball point pen, the rotation is not used for extending and retracting a ball point pen reservoir but for positioning the wing disk above the rods.

According to a further embodiment, the actuator has at least one second control cam, which may be activated by contact from below and which slopes in the same peripheral direction as the first control cam, the actuator being able to be pushed thereby from above against the first control cam. The second control cam rotates the rod drive with the first control cam partially below the lower end of the second guide element when the upper end of the first guide element exceeds the lower end of the second guide element. According to a further embodiment, the second control cam is configured at the lower end of the lateral stop of the actuator. According to a further embodiment, the first control cam which cooperates with the second control cam is the same first control cam which is rotated below the lower end of the first guide element. According to a further embodiment, the first control cam which cooperates with the second control cam is arranged further up and offset radially inwardly relative to the at least one first control cam which is rotated below the first guide element.

According to a further embodiment, the second guide element has on the lower end at least one third control cam, which may be activated by contact from below and which slopes in the same peripheral direction as the first control cam, the first control cam sliding upwardly past said third control cam with the return displacement of the actuator. With the return displacement of the actuator upwardly, the first control cam slides on the third control cam, whereby the rod drive is rotated further until the driver element is positioned above a further toothed rod.

According to a further embodiment, the actuator is pushed away from the rod drive by a spacer spring supported on the rod drive. The actuator is displaceable toward the rod drive counter to the action of the spacer spring. After the actuator is released, the spacer spring pushes the actuator away from the rod drive. As a result, the first guide element is released from the lateral stop of the actuator so that the rod drive is rotatable with the driver element into a position above a further rod. According to a further embodiment, the rod drive is pushed against the actuator by a compression spring supported on an abutment arranged fixedly in position in the pipette housing. The rod drive is displaceable downwardly by means of the actuator counter to the action of the compression spring. After the actuator is released, the compression spring pushes the rod drive upwardly against the second guide element which, according to a preferred embodiment, is formed by the third control cam. The third control cam or, respectively, the second guide element thus generates the rotation of the rod drive.

According to a further embodiment, the gear mechanism comprises a track carrier having the driver element and a horizontal control pin guide and having tracks arranged on different sides of a vertical first plane. The tracks include in each case on different sides of a second plane perpendicular to the first plane a vertical first portion with a lead-in chamfer rising to the lower or upper end. In each case at the other end of the first portion a second portion which is angled-back or curved to the other side of the second plane, a control pin which is connected to the operating element and which is displaceably guided horizontally on a control pin guide. A pin carrier is arranged fixedly in position in the pipette housing with a pin bearing in which a guide pin is displaceably arranged perpendicular to the first plane. A vertical displacement of the track carrier the guide pin is displaceable at are end protruding from the pin carrier by the lead-in chamfer of the one track until the guide pin engages with the other end in the other track, in which the guide pin, with a subsequent vertical displacement of the track carrier in the opposing direction, is guided along the angled-back or curved second portion. As a result, the track carrier is laterally displaced with the driver element, and with a subsequent vertical displacement of the track carrier in the opposing direction the guide pin is displaced at the protruding end by the lead-in chamfers of the other track, so that the guide pin engages with the other end in the one track in which the guide pin, with a subsequent vertical displacement of the track carrier in the opposing direction, is guided along the angled-back or curved second portion, and as a result the track carrier is laterally displaced with the driver element in the opposing direction. As a result, the track carrier returns into the initial position, the above-described movement cycle being able to be repeated starting therefrom. By the lateral and vertical displacement, the track carrier with the driver element is able to be positioned alternately above different rods and the rods are alternately displaceable downwardly. According to a further embodiment, the end of the second portion of each track remote from the first portion is connected to a vertical third portion.

According to an embodiment, the track carrier includes a frame with two parallel plate-shaped frame parts, which are kept at a distance from one another by spacers, and which have tracks on the inner faces, the pin carrier being arranged therebetween. According to a further embodiment, a frame part has at the ends bar-like projections which form the spacers. According to a further embodiment, the pin carrier is a bar which engages between the two plate-shaped frame parts. According to a further embodiment, the upper end and/or the lower end of the pin carrier is arranged fixedly in position in the pipette housing. According to a further embodiment, the driver element is the lower face of the track carrier.

According to a further embodiment, the tracks are grooves on the inner faces of the frame parts and the grooves have a groove depth on the lead-in chamfers which gradually reduces toward the ends of the grooves. The grooves ensure a secure guidance of the guide pin in the tracks.

According to a further embodiment, the gear mechanism arranged entirely above the rods. By the arrangement of the gear mechanism entirely above the rods, a design which is particularly compact and simple to assemble is possible. According to a further embodiment, the gear mechanism is a sub-assembly. As a result, in particular, the assembly is simplified. With the embodiment of the output member as a driver element, the sub-assembly with the driver element only has to be assembled above the rods, since the output member is not fixedly connected to the rods.

Another embodiment of a pipette for use with a pipette tip or pipette syringe having a piston and a cylinder comprises a stem-shaped pipette housing. A first retaining apparatus is positioned at the lower end of the pipette housing for the releasable retention of the cylinder. A lifting rod is arranged in the pipette housing with a second retaining apparatus at the lower end for the releasable retention of the upper end of a piston rod of the piston and the displacement of a sealing region of the piston in a piston running region above a tip opening at the lower end of the cylinder. An operating element protrudes outwardly from the pipette housing and is configured to be displaced relative to the pipette housing in the axial direction of the lifting rod. A gear mechanism is arranged in the pipette housing and comprises a drive which is driven by the operating element and an output driving the lifting rod. The output comprises a multi-stage toothed rod with a plurality of parallel tooth rows having different or equal heights, a further toothed rod fixedly connected to the lifting rod and two pinions having equal or different diameters and connected fixedly in terms of rotation to a common shaft. The one of the two pinions cooperates or meshes with the teeth of a tooth row of the multi-stage toothed rod and the other of the two pinions meshes with the teeth of the further toothed rod.

By means of the multi-stage toothed rod, pipettes may be produced by using the same parts for use with pipette tips having different nominal volumes, in which the operating path is the same for dispensing the nominal volume from pipette tips of different sizes. To this end, the pipettes for pipette tips having different nominal volumes are provided with different gear sets which engage in different tooth rows of the multi-stage toothed rod, in order to achieve different gear multiplications/gear reductions between the multi-stage toothed rod and the toothed rod fixedly connected to the lifting rod. The same toothed rods may be used for all of the pipette variants. Depending on the pipette variant, only the different gear sets have to be assembled thereon.

According to a further embodiment, the toothed rod has three tooth rows comprising teeth of different heights or equal heights. According to a further embodiment, the different tooth rows are arranged adjacent to one another in stages with the height rising from stage to stage.

In an embodiment, the multi-stage toothed rod is additionally coupled via the gear set, which has the two pinions connected fixedly in terms of rotation to a common shaft, to the further toothed rod which is fixedly connected to the lifting rod.

In the present application the terms "top" and "bottom" and "vertically" and "horizontally" and terms derived therefrom such as for example "above" and "below" and "above one another" refer to an arrangement of the pipette in which the pipette housing is oriented vertically and the first retaining apparatus is located on the downwardly facing end of the pipette housing. In this orientation a cylinder of a pipette tip retained in the first retaining apparatus is oriented vertically, wherein the tip opening is arranged at the bottom.

BRIEF DESCRIPTION OF THE DRAWINGS

The invention is described in more detail hereinafter with reference to the accompanying drawings of exemplary embodiments. In the drawings:

FIG. 6a illustrates a right side view of an embodiment of an actuator of the pipette;

FIG. 6b illustrates a front view of the embodiment of an actuator of the pipette from FIG. 6a;

FIG. 6c illustrates a left side view of the embodiment of the actuator of the pipette from FIG. 6a;

FIG. 6d illustrates a perspective side view of the embodiment of the actuator of the pipette from FIG. 6a;

FIG. 7a illustrates a right side view of an embodiment of a rod drive, supporting ring, and toothed rods of a pipette;

FIG. 7b illustrates a front view of the embodiment of a rod drive, supporting ring, and toothed rods of the pipette from FIG. 7a;

FIG. 7c illustrates a perspective side view of the embodiment of a rod drive, supporting ring, and toothed rods of the pipette from FIG. 7a;

FIG. 12a illustrates a perspective side view of an embodiment of an arrangement of the pipette with a three-stage toothed rod, gear set and toothed rod on the lifting rod side;

FIG. 12b illustrates a plan view of the embodiment of FIG. 12a;

FIG. 12c illustrates a perspective side view of the embodiment of FIG. 12a without the toothed rod on the lifting rod side;

FIG. 12d illustrates a plan view of the embodiment of FIG. 12a with a further gear set;

FIG. 12e illustrates a perspective side view of the embodiment of FIG. 12a without the toothed rod on the lifting rod side;

FIG. 12f illustrates a plan view of the embodiment of FIG. 12d with a further gear set;

FIG. 12g illustrates a perspective side view of the embodiment of FIG. 12d without the toothed rod on the lifting rod side FIG. 13a illustrates a front view of an embodiment of an alternative gear mechanism with a pin guided alternately in tracks on different sides of the driver element in a front view;

FIG. 13b illustrates an exploded side view of the embodiment of FIG. 13a in a first displacement position; and FIG. 13c illustrates an exploded perspective view of the embodiment of FIG. 13a.

DETAILED DESCRIPTION OF THE INVENTION

Figure 1:
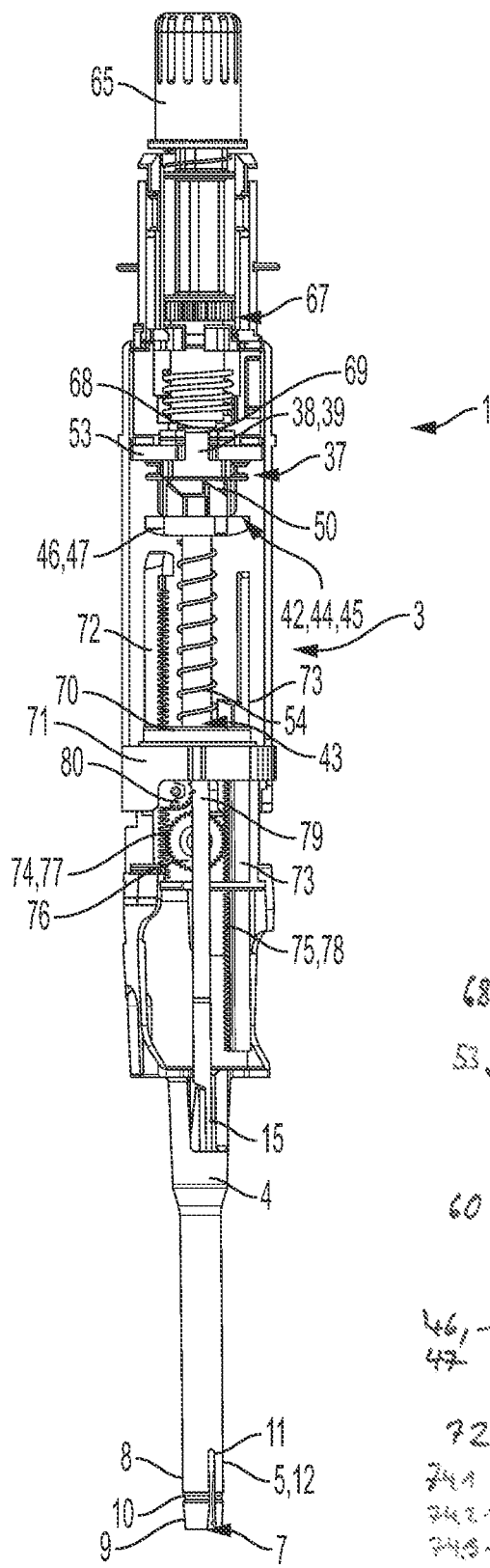
FIG. 1 illustrates a front view of an embodiment of a pipette in an initial position before pipetting.
Figure 2:
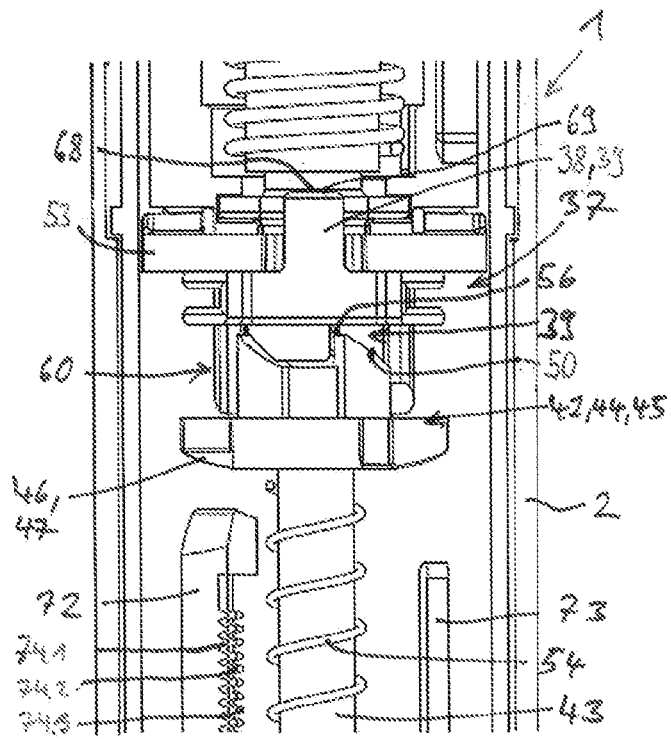
FIG. 2 an enlarged partial view of the embodiment of FIG. 1.
Figure 3:
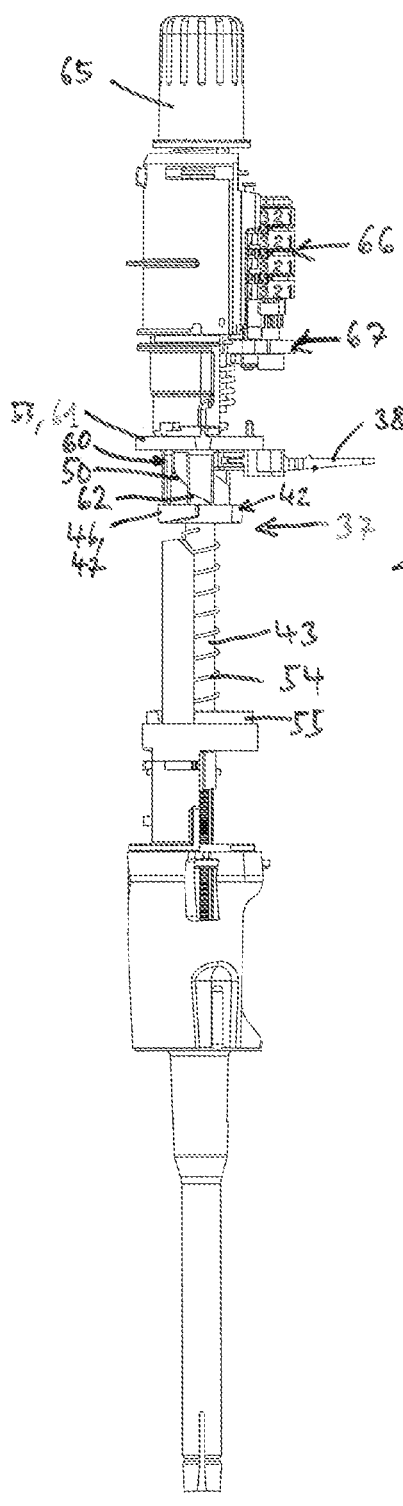
FIG. 3 illustrates a side view of the embodiment of the pipette from FIG. 1.
Figure 4:
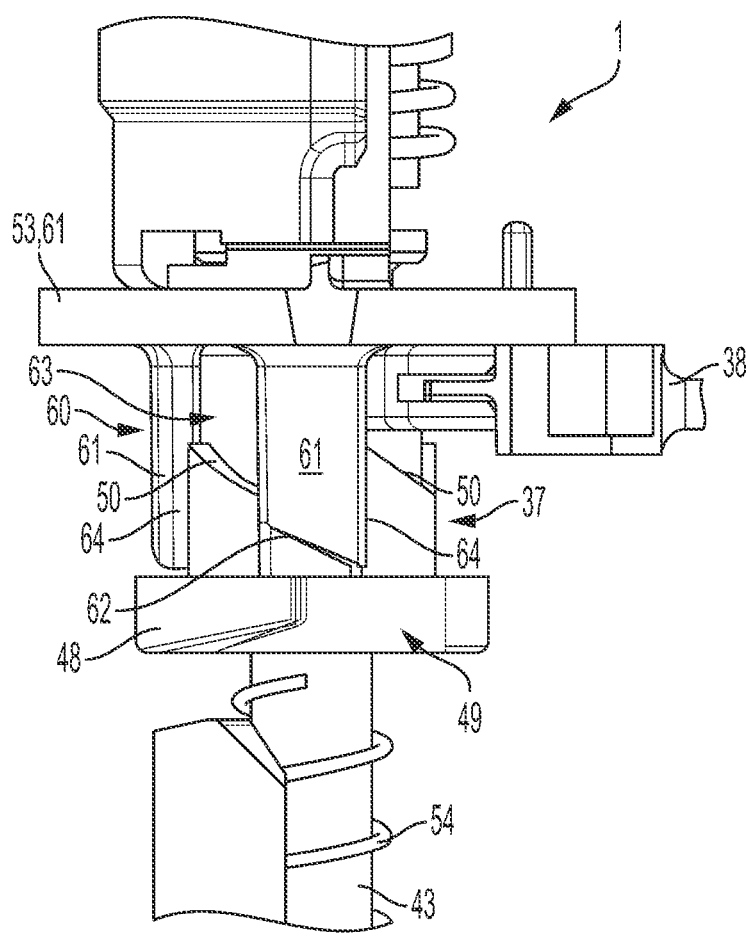
FIG. 4 illustrates an enlarged view of the embodiment of the pipette from FIG. 3.

FIGS. 1 to 5 show an embodiment of a pipette 1 which is configured as a positive displacement pipette and which has a stem-shaped (for example cylindrical) pipette housing 2 which is shown in FIG. 2 in partial view. A chassis 3, on which different components of the pipette 1 are retained, is arranged in the pipette housing 2. A hollow cylindrical shaft 4 protrudes downwardly from the lower end of the pipette housing 2. A neck 5 which has a through-bore 6 with a through-hole 7 at the lower end protrudes downwardly from the lower end of the shaft 4.

Figure 5:
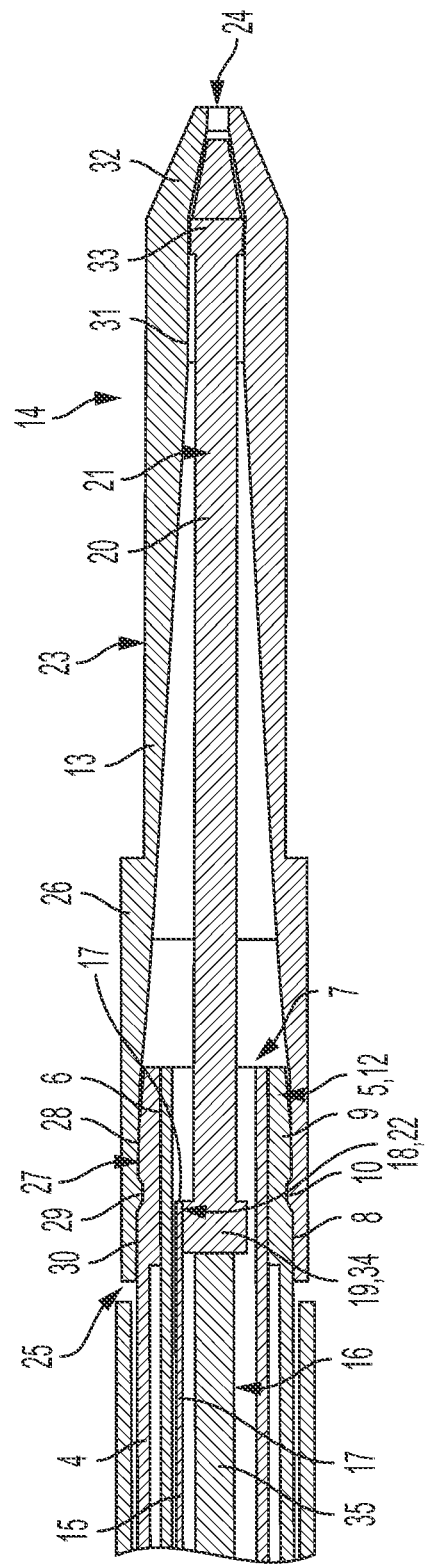
FIG. 5 illustrates a sectional view of an embodiment of a neck of the pipette with a pipette tip attached thereto.

According to FIG. 5, the neck 5 comprises an upper neck portion 8 having the shape of a hollow cylinder and therebelow a lower neck portion 9 having the shape of a hollow sphere. An annular groove 10 circulates on the outer periphery of the neck 5 between the upper neck portion 8 and the lower neck portion 9. From the lower end of the neck 5 two diametrically opposing slots 11 extend beyond the annular groove 10 along the neck 5. The neck 5 is a first retaining apparatus 12 for the releasable retention of a cylinder 13 of a pipette tip 14.

A lifting rod 15 is guided from above through the shaft 4 into the neck 5. The lifting rod 15 is hollow cylindrical at the bottom and is provided with a longitudinal slot 16 starting from the lower end. At its lower end 17 the lifting rod 15 forms a receiver 18 for the upper end 19 of a piston rod 20 of a piston 21 of a pipette tip 14. The receiver 18 is a second retaining apparatus 22 for releasably retaining the upper end 19 of a piston rod 20 of the pipette tip 14.

FIG. 5 shows the neck 5 with a pipette tip 14 attached thereto. The pipette tip 14 comprises a tubular body 23 which has a tip opening 24 at the lower end, a collar 26 having an attachment opening 25 at the upper end, and on the inner periphery of the collar 26 a seat region 27 for clamp-fitting onto the neck 5. The seat region 27 has a contour which is complementary to the neck 5 and which at the bottom has a conical seat portion 28 for receiving the conical lower neck portion 9, a peripheral bead 29 thereabove for engaging in the annular groove 10 of the neck 5 and a cylindrical upper seat portion 30 thereabove for receiving the cylindrical upper neck portion 8. When attached, the neck 5 is able to contract slightly in the region of the slots 11 and the pipette tip 14 is able to widen slightly in the seat region 27 until the bead 29 snaps into the annular groove 10 and the pipette tip 14 is connected by a positive and frictional connection to the neck 5.

Below the seat region 27 the tubular body 23 has a cylindrical piston running region 31. Therebelow the tubular body 23 has a tip portion 32 tapering downwardly and having the shape of a hollow truncated cone. A piston 21 is inserted in the tubular body 23. This piston comprises a sealing region 33 which is guided in the piston running region 31. A piston rod 20 which has a smaller diameter than the sealing region 33 protrudes upwardly from the sealing region 33. At the upper end the piston rod 20 has a piston head 34. According to FIG. 5, the piston head 34 is pressed from below into the receiver 18 of the lifting rod 15.

An ejection rod 35 is arranged inside the lifting rod 15 for ejecting the pipette tip from the neck 5. The ejection rod 35 is connected to an ejection drive. For simplification, details of the ejection drive are not shown in the figures. The ejection drive may be configured, in particular, as disclosed in the European patent application EP 19 150 808.4. In this regard, reference is made to the European patent application EP 19 150 808.4, the contents thereof being incorporated herewith in the present application.

The lifting rod 15 serves for displacing the piston 21 in the cylinder 13 of the pipette tip 14. An operating element 36 in the form of an operating knob arranged outside the pipette housing is connected to the lifting rod 15 via a gear mechanism 37 arranged in the pipette housing. The operating element 36 is connected via an operating lever 38 to an actuator 39 of the gear mechanism 37. The operating lever 38 engages through a vertical slot in the pipette housing 2 so that when the operating element 36 is actuated the actuator 39 is displaceable in the vertical direction. The actuator 39 is a drive 40 and a movable input member 41 of the gear mechanism 37.

In the pipette housing 2 below the actuator 39 a rod drive 42 is rotatably mounted on a vertical guide tube 43 and is guided in a vertically displaceable manner (see FIG. 6). The rod drive 42 is an output 44 and a movable output member 45 of the gear mechanism 37. The rod drive 42 has a substantially hollow cylindrical body which has at the bottom a driver element 46 in the form of a wing disk 47, which has two diametrically opposing wings 48 protruding radially outwardly from the periphery of the rod drive 42 and therebetween two diametrically opposing undercuts 49. On the outer periphery the rod drive 42 has four first control cams 50 which may be activated by contact from above and for vertical first guide grooves 51 therebetween. The lateral edges of the vertical first guide grooves 51 of the rod drive form first guide elements 52. The first control cams 50 slope in the same peripheral direction which runs from left to right in FIG. 1.

The vertical guide tube 43 is guided through a horizontal first support element (supporting ring) 53. A compression spring 54 in the form of a coil spring is arranged on the guide tube 43, said coil spring being supported at the bottom on an abutment 55 arranged fixedly in position in the pipette housing and at the top pushing the rod drive 42 against the activator 39.

Figure 6:
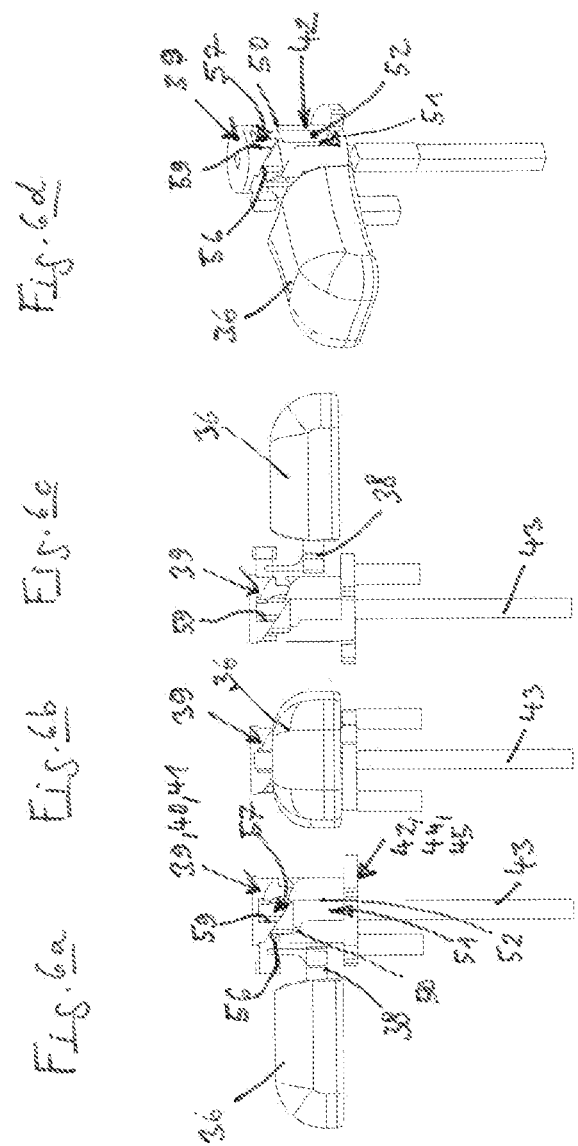

According to FIG. 6, the actuator 39 is also vertically displaceably guided on the guide tube 43. The actuator has on the lower face four second control cams 56, vertical gaps 57 being arranged therebetween. The second control cams 56 slope in the same peripheral direction as the first control cams 50. A spacer spring 58 in the form of a coil spring guided on the guide tube 43 is present between the actuator 39 and the rod drive 42, said spacer spring pushing the actuator 39 away from the rod drive 42. The actuator 39 also has vertical edges which form a lateral stop 59.

A hollow cylindrical control and guide apparatus (apparatus) 60 which is configured on the lower face of the first support element 53 is arranged fixedly in position in the pipette housing 2. The guide tube 43 is guided through this apparatus 60. The apparatus 60 is formed by four parallel cylinder shells 61, each thereof at the bottom having a third control cam 62 which may be activated by contact from below. The third control cams 62 slope in the same peripheral direction as the first control cams 50. Between the cylinder shells 61 the apparatus 60 has vertical second guide grooves 63. The lateral edges of the second guide grooves 63 form second guide elements 64.

An adjusting knob 65 for adjusting a metering volume is arranged on the upper face of the pipette housing 2. The metering volume is adjustable by rotating the adjusting knob 65. A counter 66 arranged therebelow in the pipette housing 2 displays the respectively adjusted metering volume. The adjusting knob 65 and the counter 66 are coupled via a transmission mechanism 67 to a threaded spindle which protrudes from above into the guide tube 43. Above the actuator 39, an upper stop 68 which is fixedly connected to the guide tube 43 is arranged fixedly in position in the pipette housing 1. The upward displacement of the actuator 39 is defined by the bearing of the actuator 39 with an upper bearing surface 69 against the lower face 68 of the support element 53. The travel is defined downwardly by the abutment of a pipette lifting rod protruding from below into the guide tube 42 against the adjustable threaded spindle. Thus the travel of the lifting rod 15 is defined by the abutment of a pipette lifting rod which is displaceable by means of the rod drive 42 against the adjustable threaded spindle.

Two vertically displaceable toothed rods 72, 73 are guided below the driver element 46 in a third support element 71 of the chassis 3. The tooth rows 74, 75 of the toothed rods 72, 73 face one another. A gearwheel 76 which meshes with teeth 77, 78 of both toothed rods 72, 73 is rotatably mounted between the two toothed rods 72, 73 on the chassis 3. The two toothed rods 72, 73 are coupled together by the gearwheel 76 so that in the vertical direction the toothed rods are only displaceable in opposing directions to one another.

The toothed rods 72, 73 are arranged below the driver element 46 such that at the same time only one wing 48 is always able to be positioned above one of the two toothed rods 72, 73 and one undercut 49 above the other of the two toothed rods 72 73.

It is possible to embody the invention such that one of the two toothed rods 72, 73 is directly connected to the lifting rod 15 or, respectively, is configured integrally therewith. In the exemplary embodiment, a gear multiplication mechanism is present between the toothed rod 72 and the lifting rod 15. According to FIG. 7*b*, the first toothed rod 72 arranged on the left has three tooth rows arranged adjacent to one another with teeth 77 of different heights or equal heights in different tooth rows 74.1, 74.2, 74.3. The tooth rows 74.1, 74.2, 74.3 form three stages arranged adjacent to one another. The second toothed rod 73 on the right in FIG. 7*b* has only one single tooth row 75. The lifting rod 15 is fixedly connected at the upper end to a third toothed rod 79 having teeth 78, preferably configured integrally therewith. A gear set 80 with two pinions 81, 82 having equal or different diameters is arranged between the first toothed rod 72 with the three tooth rows 74.1, 74.2, 74.3 and the third toothed rod 79. The pinions 81, 82 of the gear set 80 are connected fixedly in terms of rotation to a shaft 83 which is rotatably mounted in the chassis 3. A first pinion 81 meshes with the teeth 78 of the third toothed rod 79 and a second pinion 82 meshes with the teeth 77 of one of the tooth rows 74.1, 74.2, 74.3 of the first toothed rod 72. In this manner a defined gear ratio is produced between the displacement of the first toothed rod 72 and the third toothed rod 79. The third toothed rod 79 is the pipetting lifting rod, the upward displacement thereof being defined by the adjustable threaded spindle.

If, from the initial position according to FIGS. 1 to 4, the operating element 36 is pushed downwardly, the actuator 39 is initially displaced downwardly counter to the action of the spacer spring 58 until the second control cam 56 bears against the first control cam 50. With the further downward displacement of the operating element 36, the actuator 39 entrains the rod drive 42 downwardly. In this case the rod drive 42 is impeded from rotating about the guide tube 43 by the bearing of a first guide element 52 against a second guide element 64.

Figure 7:
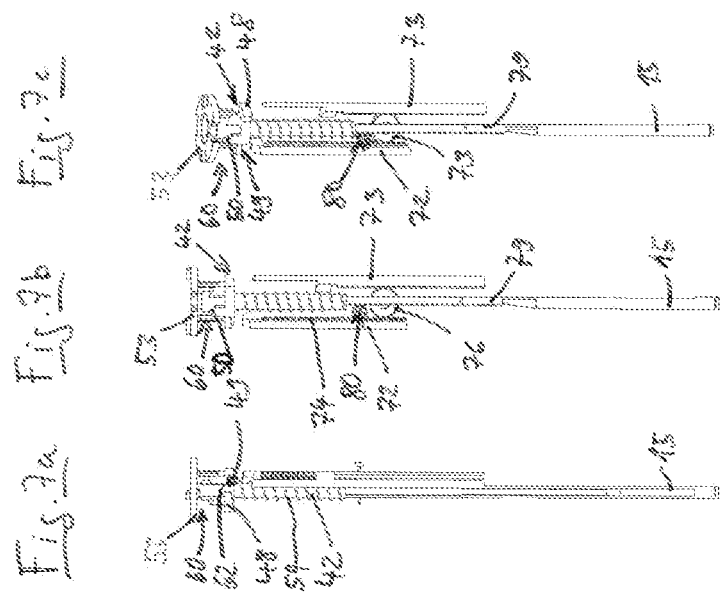
Figures 8, 9:
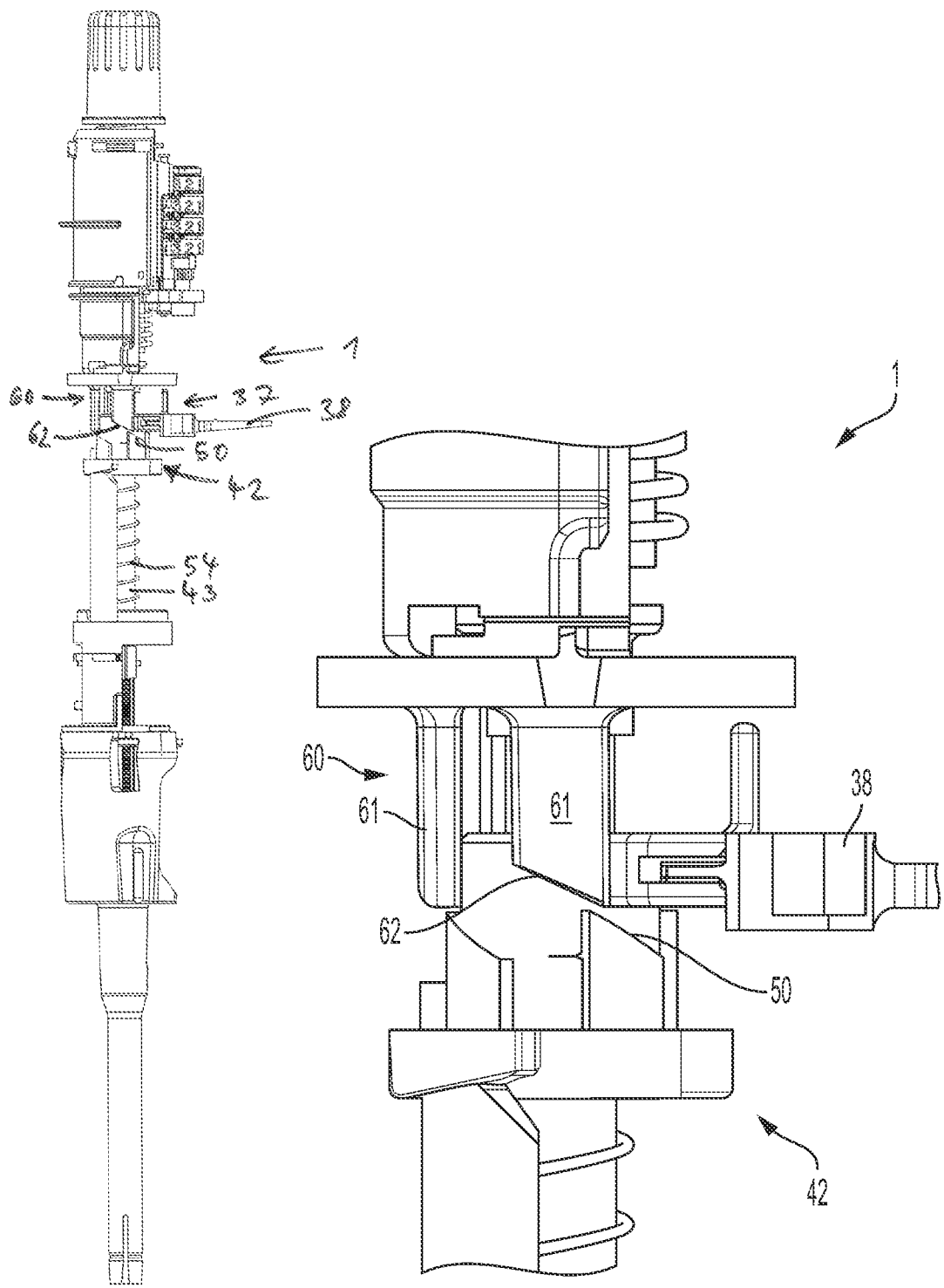
FIG. 8 illustrates an right side view of the embodiment of the pipette of FIG. 1 during pipetting after a partial travel has been carried out.
FIG. 9 illustrates an enlarged view of a portion of the embodiment of the pipette of FIG. 8.
Figure 10:
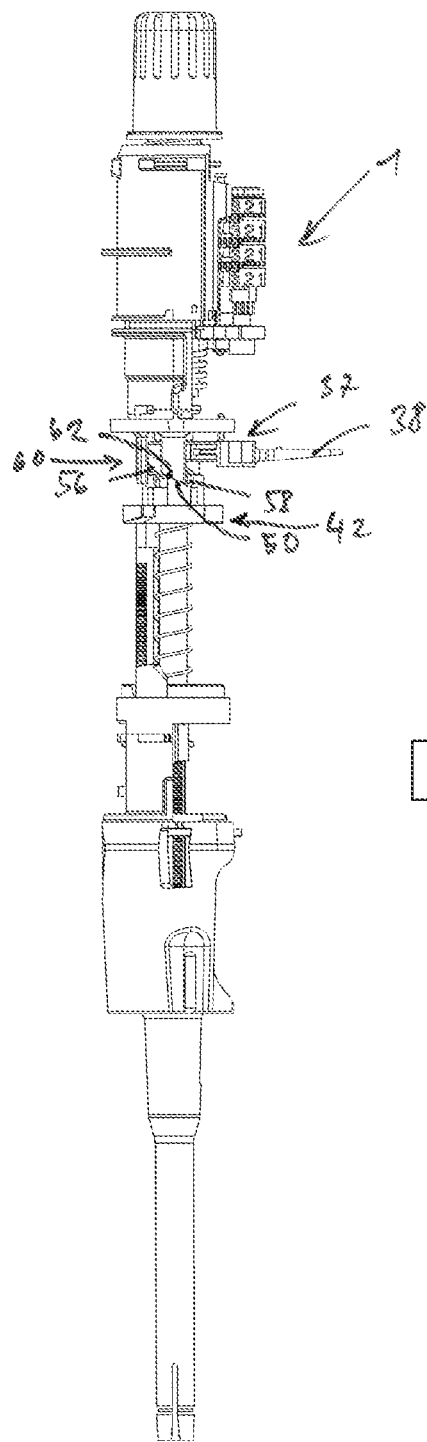
FIG. 10 illustrates a right side view of the embodiment of the pipette from FIG. 8 during pipetting with a return displacement of the actuator upwardly into the initial position.
Figure 11:
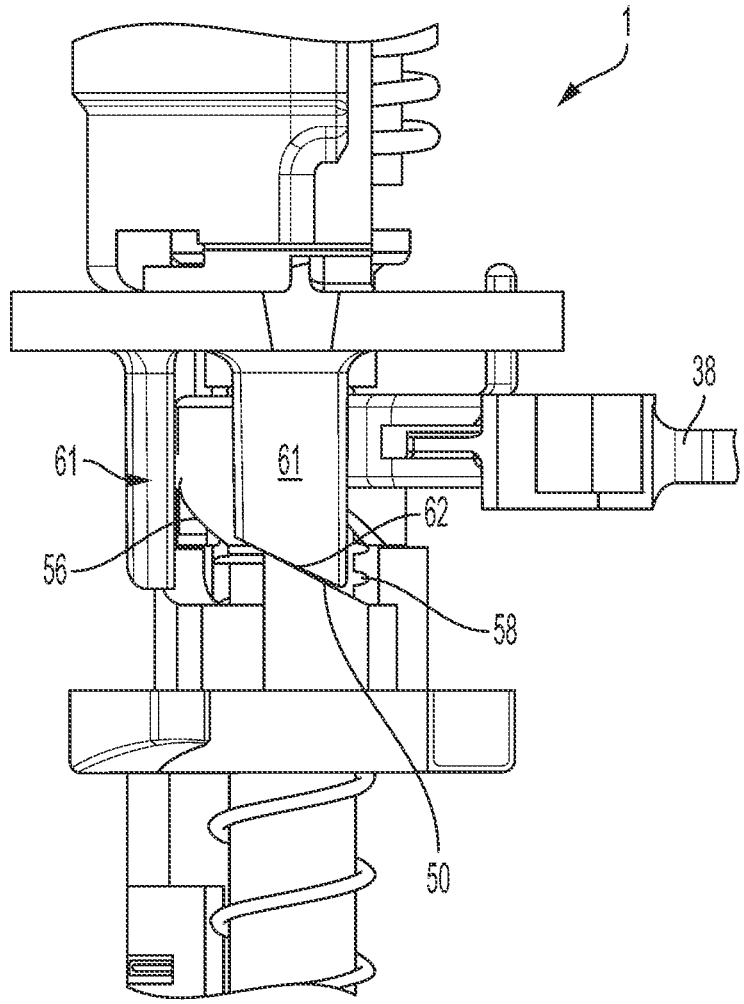
FIG. 11 illustrates an enlarged view of a portion of the embodiment of the pipette from FIG. 10.

According to FIGS. 7 and 8 after partial travel (for example 10% of the travel for dispensing the nominal volume from the pipette tip) the upper end of the first guide element 52 reaches the lower end of the second guide element 64. As a result, with a further downward displacement of the actuator 39, the rod drive 42 is rotated by the second control cam 56 on the first control cam 50 below the third control cam 62, until the first guide element 52 bears against the lateral stop 59 of the actuator 39. This is the case, for example, with a rotation of 8 degrees. With the further downward displacement of the actuator 39 the rod drive 42 is entrained downwardly counter to the action of the compression spring 54 until one of the wings 48 of the driver element 46 is positioned on the upper end of one of the toothed rods 72, 73. Subsequently the toothed rod 72 or 73 is entrained and the lifting rod 15 is lifted until the third toothed rod 79 abuts against the threaded spindle. The respective other toothed rod 72, 73 is able to move upwardly through an undercut 49 of the driver element 46.

After releasing the operating element 36, the actuator 39 is pushed away from the rod drive 42 by the action of the spacer spring 58. As a result, the lower end of the lateral stop 59 is displaced beyond the upper end of the first guide element 52 so that the first guide element 52 is released from the lateral stop 59. Since the compression spring 54 pushes from below against the rod drive 42, the first control cam 50 slides on the third control cam 62 and the rod drive 42 is rotated further until a first guide element 52 bears against a second guide element 64 of the supporting ring 60. Subsequently the rod drive 42 is displaced hack upwardly by the compression spring 54. The toothed rods 72, 73 maintain their position at the end of the downward displacement of the rod drive 42. The rod drive 42 is displaced upwardly by the compression spring 54 sufficiently far until the driver element 46 is arranged above the upper ends of both toothed rods 72, 73. By this rotation of the rod drive 42 an undercut 49 is positioned above the last downwardly displaced toothed rod 72, 73 and a wing 48 is positioned above the last upwardly displaced toothed rod 72, 73. As a result, with a further actuation of the operating element 36 the last upwardly displaced toothed rod 72, 73 is displaced downwardly and accordingly the last downwardly displaced toothed rod 62, 73 is displaced upwardly.

The pipette 1 may be used as will not be explained. According, to FIG. 5, firstly a pipette tip 14 is clamp-fitted with the seat region 27 onto the neck 5, so that the bead 29 engages in the annular groove 10. At the same time, the receiver 18 is pressed onto the upper end 19 of the piston rod 20. For receiving liquid, the pipette 1 is immersed into the liquid with the lower end of the pipette tip 14 retained thereon. Then the operating element 36 is pushed downwardly. By means of the rod drive 42 the toothed rod 72 is hereby displaced downwardly and the lifting rod 15 is moved upwardly. The piston 21 is hereby displaced upwardly and the liquid aspirated into the pipette tip 14. When the operating element 36 has carried out the set travel, the pipette tip 14 is filled with a specific quantity of liquid. Then the operating element 36 is released and displaced upwardly by the compression spring 54 and the spacer spring 58 until it bears against the upper stop 68.

For dispensing the received quantity of liquid, the pipette 1 may be oriented with the pipette tip 14 toward a different receptacle. By pushing the operating element 36 again downwardly, the toothed rod 72 is in turn displaced downwardly, whereby the lifting rod 15 is displaced downwardly and the quantity of liquid is dispensed from the pipette tip 14. The discharge and dispensing of liquid may be carried out repeatedly. For changing the pipette tip 14 an additional ejection apparatus is used or the pipette tip 14 is removed by hand from the neck 5 and pulled out of the receiver of the lifting rod 15.

According to FIG. 12, by means of the multi-stage first toothed rod 72 pipettes 1 may be advantageously used for applications with pipette tips 14 having different nominal volumes, substantially by using the same parts. To this end, the different pipettes 1 simply have to be provided with different gear sets 80 which couple the first toothed rod 72 to the third toothed rod 79.

To this end, according to FIGS. 12a to c, a gear set 80.1 is used which has two adjacent pinions 81.1, 82.1 with equal or different diameters, one thereof engaging in the lowest tooth row 74.1 of the first toothed rod 72 and the other thereof meshing with the third toothed rod 79. This embodiment is intended for use, for example, with pipette tips having nominal volumes of 10 µl and 100 µl. Since the nominal volumes differ from one another by a decimal power, the adjusted nominal volume may be read by means of the same counter. Optionally, this counter may have a displaceable marking which is adjusted by the respectively used pipette tip, which to this end may have a collar of variable height. Such an automatic adjustment of the counter is disclosed in the European patent application EP 18 168 763.3. In this regard, reference is made to the European patent application EP 18 168 763.3, the contents thereof being incorporated herewith in the present application.

According to FIGS. 12d and e, the third toothed rod 79 meshes with a pinion 81.2 of the same embodiment as in FIGS. 12a to c. The gear set 80.2 also has a pinion 82.2 with a smaller diameter which meshes with the central tooth row 74.2 of the first toothed rod 72. As a result, a different gear multiplication or, respectively, gear reduction is achieved between the displacement of the three stage first toothed rod 72 and the third toothed rod 79.

According to FIGS. 12f and g, a pinion 81.3 which is configured as in FIG. 12a to c meshes with the teeth of the third toothed rod 79. The gear set 80.3 also has a pinion 81.3 with an even smaller diameter than in FIGS. 12d and e which meshes with the teeth of the highest tooth row 74.3 of the first toothed rod 72. As a result, a different gear multiplication or, respectively, gear reduction is achieved than in FIGS. 12a to e. As a result, the travel of the operating element 36 may be kept the same for dispensing the nominal volume for pipette tips 14 of different sizes.

According to FIG. 13, a further gear mechanism 84 for the alternate activation of two toothed rods 72, 73 has a track carrier 85. This track carrier is configured as a frame 86 which comprises two parallel plate-shaped frame parts 86.1, 86.2 and two bar-shaped spacers 87.1, 87.2. The spacers 87.1, 87.2 run along the vertical edges of the frame part 86.2 and are configured integrally therewith. Adjacent to the vertical edges, both frame parts have bore holes 88.1, 88.2 for screwing the two frame parts 86.1, 86.2 together. Thus a channel is formed between the frame parts 86.1, 86.2. Pins and bores for press-fitting, snap hooks for snap-fitting, etc. the frame parts 86.1, 86.2 may also be present instead of the bore holes and screws.

Tracks 89, 90 in the form of grooves are configured on the inner faces of the frame parts 86.1, 86.2 which face one another. These tracks have in each case a vertical first portion 89.1, 90.1 which has at the base a lead-in chamfer 91, 92 so that the depth of the first portion 89.1, 90.1 in each case reduces from top to bottom. In each case an angled-back second portion 89.2, 90.2 of the track adjoins the upper end of the first portion 89.1, 90.1 of the track. In each case a vertically downwardly extending third portion 89.3, 90.3 of the track adjoins the lower end of the second portion. The third portion 89.3, 90.3 extends downwardly further than the first portion 89.1, 90.1.

The two tracks 89, 90 are configured to mirror-symmetrically to one another so that the first portion 89.1 of the first track 89 and the third portion 90.3 of the second track 90 are arranged in the same vertical plane perpendicular to the plate-shaped frame parts 86.1, 86.2. Moreover, the third portion 89.3 of the first track 89 and the first portion 90.1 of the second track 90 are arranged in the same vertical plane perpendicular to the frame parts 86.1, 86.2. Finally, the second portions 89.2, 90.2 of the first and the second track 89, 90 are arranged in the same plane perpendicular to the frame parts and inclined relative to the vertical.

A bar-shaped pin carrier 93 is arranged between the two frame parts 86.1, 86.2. This pin carrier is guided on the two outer faces on the inner faces of the plate-shaped frame parts 86.1, 86.2. The pin carrier 93 has a pin bearing 94 which is configured in the form of a through-bore perpendicular to the frame parts 86.1, 86.2. A guide pin 95 is inserted into the pin bearing 94, the length thereof exceeding the depth of the pin carrier 93. If the guide pin 95 on the one side of the pin carrier 93 is inserted flush with its outer face into the pin bearing 94, on the other side it protrudes to a maximum extent, as far from the pin carrier 93 as the depth of the second portion 89.2, 90.2 and the third portion of the groove-shaped track 89, 90. The pin carrier 93 protrudes upwardly and downwardly beyond the frame 86. The pin carrier 93 is fixed in position at the upper end and at the lower end in the pipette housing 2.

The lower face of the frame 86 forms a driver element 96 for the alternate displacement of two toothed rods 72, 73 for the control of the upward and downward movement of a lifting rod 15. One of the two frame parts 86.1, 86.2 is provided on the outer face with a horizontal control pin guide which is preferably configured as a groove.

The operating element 36 is guided with a control pin on the control pin guide. Preferably, the operating element 36 is connected via an operating lever 38 to the control pin, wherein the operating lever 38 is able to engage through a slot in the pipette housing 2.

The function of the gear mechanism will now be described starting from an initial position in which the guide pin 95 is located at the upper end of the first portion 89.1 of the first track 89. When displacing the operating element 36 upwardly, the guide pin 95 is pushed by the lead-in chamfers 91 of the first track 89 into the third portion 90.3 of the second track 90. The frame 86 is displaceable further upwardly until the guide pin bears against the lower end of the third portion 90.3 of the second track 90.

By the subsequent downward displacement of the operating element 36, the guide pin 95 is moved upwardly along the third portion 90.3 and the second portion 90.2 of the second track 90. In this case, a toothed rod 72, 73 may be displaced downwardly by the driver element 96. With the displacement along the second portion 90.2 the track carrier 85 is laterally displaced since the pin carrier 93 is secured in the pipette housing 2. Since the control pin engages in the horizontal control pin guide, the lateral displacement of the track carrier 85 is not impeded.

With a subsequent upward movement of the operating element 36, the guide pin 95 is moved along the lead-in chamfers 92 of the second track 90 and as a result pushed into the third portion 89.3 of the first track 89. The track carrier 85 may be displaced further upwardly until the guide pin 95 bears against the lower end of the third track 89.3. With the subsequent downward displacement of the operating element 36, the guide pin 95 is initially displaced upwardly in the third portion 89.3 and then in the second portion 89.2 of the first track 89. In this case, the other toothed rod 72, 73 may be displaced downwardly by the driver element 96. With the displacement in the second portion 89.2 the track carrier 95 is moved back laterally into the initial position. The same movement cycle may then be repeated.

LIST OF REFERENCE NUMERALS

1 Pipette
2 Pipette housing
3 Chassis
4 Shaft
5 Neck
6 Through-bore
7 Through-hole
8 Upper neck portion
9 Lower neck portion
10 Annular groove
11 Slots
12 First retaining apparatus
13 Cylinder
14 Pipette tip
15 Lifting rod
16 Longitudinal slot
17 Lower end of lifting rod
18 Receiver
19 Upper end of piston rod
20 Piston rod
21 Piston
22 Retaining apparatus
23 Tubular body
24 Tip opening
25 Attachment opening
26 Collar
27 Seat region
28 Conical seat portion
29 Bead
30 Upper seat portion
31 Piston running region
32 Syringe portion
33 Sealing region
34 Piston head
35 Ejection rod
36 Operating element
37 Gear mechanism
38 Operating lever
39 Actuator
40 Drive
41 Input member
42 Rod drive
43 Guide tube
44 Output
45 Output member
46 Driver element
47 Wing disk
48 Wing
49 Undercut
50 First control cam
51 First guide groove
52 First guide element 53 First carrier element
54 Compression spring
55 Abutment
56 Second control cam
57 Gap
58 Spacer spring
59 Lateral stop
60 Control and guide apparatus
61 Cylinder shell
62 Third control cam
63 Second guide groove
64 Second guide element
65 Adjusting head
66 Counter
67 Transmission mechanism
68 Lower face
69 Upper bearing surface
70 Lower stop
71 Third carrier element
72 First toothed rod
73 Second toothed rod
74, 74.1, 74.2, 74.3 Tooth row
75 Tooth row
76 Gearwheel
77, 78 Tooth
79 Third toothed rod
80.1, 80.2, 80.3 Gear set
81 First pinion
82 Second pinion
83 Shaft
84 Gear mechanism
85 Track carrier
86 Frame
86.1, 86.2 Frame part
87.1, 87.2 Spacer
88.1, 88.2 Bore hole
89 First track
90 Second track
89.1, 90.1 First portion of track
89.2, 90.2 Second portion of track
89.3, 90.3 Third portion of track
91, 92 Lead-in chamfer
93 Pin carrier
94 Pin bearing
95 Guide pin
96 Driver element

The invention claimed is:
1. A pipette for use with a pipette tip or syringe including a piston positioned within a cylinder, the pipette comprising:
   a pipette housing comprising a stem shape and extending between an upper end and a lower end;
   a first retaining apparatus positioned at the lower end of the pipette housing and configured for releasable retention of the cylinder;
   a lifting rod positioned within the pipette housing and comprising a second retaining apparatus at the lower end of the pipette housing configured for releasable retention of an upper end of a piston rod of the piston and further configured to displace a sealing region of the piston in a piston running region above a tip opening at the lower end of the cylinder;
   two parallel rods positioned in the pipette housing, wherein one of the two parallel rods is coupled to the lifting rod;
   a deflection apparatus configured to couple the two parallel rods together, wherein the two parallel rods are configured to be simultaneously displaced in opposing directions;
   an operating element configured to protrude outwardly from the pipette housing and configured to be displaced relative to the pipette housing in an axial direction of the lifting rod; and
   a gear mechanism arranged in the pipette housing and comprising,
      a drive comprising a moveable input member and configured to be driven by the operating element, and
      an output comprising at least one moveable output member and configured to drive the two parallel rods,
   wherein successive displacements of the moveable input member from the same initial position by the operating element is configured to alternately displace one of the two parallel rods and then another of the two parallel rods by the at least one moveable output member,
   wherein the at least one moveable output member of the gear mechanism is a driver element configured to be displaced alternately into a position above one of the two parallel rods and to displace the one of the two parallel rods downwardly, and wherein the driver element is configured to subsequently be displaced into a position above another of the two parallel rods and to displace this rod downwardly,
   wherein the driver element is a wing disk rotatably mounted about an axis parallel to the two parallel rods, and wherein successive displacements of the input member from an initial position is able to be positioned alternately with a wing above one of the two parallel rods and at a same time with an undercut above another of the two parallel rods, and with an undercut above the one of the two parallel rods and at the same time with a wing above the other of the two parallel rods.

2. The pipette according to claim 1, wherein the two parallel rods each define a plurality of teeth on at least one surface and wherein the deflection apparatus comprises a gearwheel configured to cooperate with the teeth of the two parallel rods in order to displace the parallel rods simultaneously in opposing directions.

3. The pipette according to claim 1, wherein the gear mechanism includes a rod drive that comprises,
   the driver element,
   at least one first control cam, which may be activated by contact from above and which slopes in a peripheral direction,
   at least one first guide element,
   an actuator which has a lateral stop and which may be pushed from above by means of the operating element in the axial direction of the rod against the first control cam, and
   at least one second guide element which is arranged fixedly in position in the pipette housing,
   wherein the at least one second guide element is configured to guide the rod drive on the first guide element in the axial direction until the upper end of the first guide element is displaced beyond the lower end of the second guide element,
   wherein the rod drive with the first control cam is rotated until the first guide element bears against the lateral stop of the actuator partially below the lower end of the second guide element, and wherein with a return displacement of the actuator upwardly, the first guide element is released from the lateral stop when the lower end of the first guide element is displaced beyond the upper end of the lateral stop, and wherein the rod drive with the first control cam slides past the lower end of the second guide element until the rod drive with the first guide element is rotated into a position bearing against the second guide element.

4. The pipette according to claim 3, wherein the actuator comprises a second control cam configured to be activated by contact from below, wherein the second control cam in a same peripheral direction, and wherein the actuator is configured to be pushed thereby from above against the first control cam.

5. The pipette according to claim 3, wherein the first guide element comprises a third control cam configured to be activated by contact from below and which slopes in a same peripheral direction, and wherein the first control cam sliding upwardly past the third control cam with the return displacement of the actuator.

6. The pipette according to claim 5, wherein the actuator is pushed away from the rod drive by a spacer spring supported on the rod drive.

7. The pipette according to claim 3, wherein the rod drive is configured to be pushed against the actuator by a compression spring supported on an abutment fixedly positioned in the pipette housing.

8. The pipette according to claim 1, wherein the gear mechanism comprises a track carrier, wherein the track carrier comprises,
   the driver element,
   a horizontal control pin guide,
   tracks arranged on different sides of a vertical first plane, said tracks having in each case on different sides of a second, plane perpendicular to the vertical first plane,
   a vertical first portion with a lead-in chamfer, and
   a second portion proximate the vertical first portion, wherein the second portion which is angled.

9. The pipette according to claim 8, wherein the gear mechanism further comprises,
   a control pin connected to the operating element and configured to be displaceably guided along a control pin guide, and
   a pin carrier fixedly positioned in the pipette housing with a pin bearing,
   a guide pin arranged perpendicular to the vertical first plane and comprising an end protruding from the pin carrier,
   wherein a vertical displacement of the track carrier in a first direction is configured to displace the guide pin at the end protruding from the pin carrier by the lead-in chamfer of a first guide track until another end of the guide pin engages with a second guide track.

10. The pipette according to claim 9, wherein during subsequent vertical displacements of the track carrier, the guide pin is configured to be guided along the second portion and the track carrier is configured to be laterally displaced in a first direction with the driver element.

11. The pipette according to claim 10, wherein a vertical displacement of the track carrier in a second opposing is configured to displace the guide pin at the end protruding from the pin carrier end by the lead-in chamfer of the second track so that another end of the guide pin engages with the first track, and wherein during subsequent vertical displacements of the track carrier in the opposing second direction, the guide pin is guided along the angled second portion and the track carrier is configured to be laterally displaced in a second opposing direction with the driver element.

12. The pipette according to claim 9, wherein the track carrier comprises a frame including two parallel plate-shaped frame parts, and wherein the two parallel plate-shaped frame parts are kept apart from one another by spacers.

13. The pipette according to claim 12, wherein the two parallel plate-shaped frame parts further comprise inner comprising tracks, and wherein the pin carrier are arranged between the two parallel plate-shaped frame parts.

14. The pipette according to claim 8, wherein the driver element is a lower face of the track carrier.

15. The pipette according to claim 9, wherein the gear mechanism is arranged above the two parallel rods.

16. The pipette according to claim 15, wherein the gear mechanism is a sub-assembly.

17. The pipette according to claim 15, wherein one of the two parallel rods is a multi-stage toothed rod additionally coupled to a toothed rod which is fixedly connected to the lifting rod.

* * * * *